(12) United States Patent
Krishnan et al.

(10) Patent No.: US 11,164,235 B2
(45) Date of Patent: Nov. 2, 2021

(54) SCALABLE SYSTEMS AND METHODS FOR GENERATING AND SERVING RECOMMENDATIONS

(71) Applicant: salesforce.com, inc., San Francisco, CA (US)

(72) Inventors: Bharath K. Krishnan, Burlington, MA (US); Michael J. Torra, Burlington, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/695,860

(22) Filed: Nov. 26, 2019

(65) Prior Publication Data

US 2020/0098034 A1 Mar. 26, 2020

Related U.S. Application Data

(63) Continuation of application No. 14/886,826, filed on Oct. 19, 2015, now Pat. No. 10,497,044.

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06F 9/5072* (2013.01); *G06F 16/24575* (2019.01); *G06Q 30/0253* (2013.01); *G06Q 30/0255* (2013.01); *G06Q 30/0261* (2013.01); *G06Q 30/0271* (2013.01); *H04L 67/02* (2013.01)

(58) Field of Classification Search
None
See application file for complete search history.

(56) References Cited

U.S. PATENT DOCUMENTS 6,782,370 B1  8/2004  Stack
6,836,773 B2  12/2004  Tamayo
(Continued)

OTHER PUBLICATIONS

Hu, Pengwei, An optimized strategy for cloud computing architecture, 2010 3rd International Conference on Computer Science and Information Technology, vol. 9, pp. 374-378 (Year: 2010).*
(Continued)

*Primary Examiner* — Jeffrey A. Smith
*Assistant Examiner* — Timothy J Kang
(74) *Attorney, Agent, or Firm* — Butzel Long; Donald J. Lecher (57) ABSTRACT

A scalable recommendation engine includes stateless processors in communication with at least one memory server that stores contextual data. A router is configured to direct a recommendation request to a first stateless processor, which is configured to generate a recommendation using contextual data from the memory server. A controller monitors the available processing bandwidth of the stateless processors and deploys an additional stateless processor if the available processing bandwidth is less than a minimum available processing bandwidth threshold. The controller can remove from deployment a stateless processor if the available processing bandwidth is greater than a maximum pre-determined available processing bandwidth threshold.

17 Claims, 6 Drawing Sheets

(51) Int. Cl.
*G06F 16/2457* (2019.01)
*G06F 9/50* (2006.01)
*G06Q 30/02* (2012.01)
*H04L 29/08* (2006.01)

(56) References Cited

U.S. PATENT DOCUMENTS

| | | |
|---|---|---|
| 7,447,802 B2 | 11/2008 | Silky |
| 7,467,131 B1 | 12/2008 | Gharachorloo |
| 7,509,341 B2 | 3/2009 | Constantin |
| 7,562,370 B2 | 7/2009 | Moore |
| 7,657,436 B2 | 2/2010 | Elmore |
| 7,685,192 B1 | 3/2010 | Scofield |
| 7,725,423 B1 | 5/2010 | Pricer |
| 7,761,541 B1 | 7/2010 | Morley |
| 7,774,335 B1 | 8/2010 | Scofield |
| 7,831,476 B2 | 11/2010 | Foster |
| 7,849,201 B1 | 12/2010 | Subbarao |
| 7,971,147 B2 | 6/2011 | Subbarao |
| 7,991,740 B2 | 8/2011 | McCarthy |
| 8,112,354 B2 | 2/2012 | Lalwani |
| 8,285,595 B2 | 10/2012 | Svendsen |
| 8,290,908 B2 | 10/2012 | McCarthy |
| 8,301,623 B2 | 10/2012 | Chakrabarti |
| 8,316,031 B2 | 11/2012 | Ramer |
| 8,433,654 B2 | 4/2013 | Subbarao |
| 8,438,159 B1 | 5/2013 | Roegner |
| 8,438,183 B2 | 5/2013 | Scriffignano |
| 8,473,361 B2 | 6/2013 | Subbarao |
| 8,495,557 B2 | 7/2013 | Vinberg |
| 8,510,323 B2 | 8/2013 | Eshwar |
| 8,515,988 B2 | 8/2013 | Jones |
| 8,612,289 B2 | 12/2013 | Subbarao |
| 8,650,078 B2 | 2/2014 | Subbarao |
| 8,688,671 B2 | 4/2014 | Ramer |
| 8,756,186 B2 | 6/2014 | Bolivar |
| 8,775,570 B2 | 7/2014 | Sandholm |
| 8,943,060 B2 | 1/2015 | Krishnan |
| 2002/0059134 A1 | 5/2002 | Ebbs |
| 2002/0099579 A1 | 7/2002 | Stowell |
| 2002/0199186 A1 | 12/2002 | Ali |
| 2003/0074537 A1 | 4/2003 | Pang |
| 2004/0047354 A1 | 3/2004 | Slater |
| 2004/0078214 A1 | 4/2004 | Speiser |
| 2004/0103092 A1 | 5/2004 | Tuzhilin |
| 2004/0230499 A1 | 11/2004 | Stack |
| 2004/0260621 A1 | 12/2004 | Foster |
| 2004/0267613 A1 | 12/2004 | Chan |
| 2005/0004918 A1 | 1/2005 | Platt |
| 2005/0015384 A1 | 1/2005 | Wehrman |
| 2005/0125240 A9 | 6/2005 | Speiser |
| 2006/0047546 A1 | 3/2006 | Taylor |
| 2006/0238652 A1 | 10/2006 | Parker |
| 2006/0242609 A1 | 10/2006 | Potter |
| 2007/0118839 A1* | 5/2007 | Berstis ............... G06F 9/5072 718/105 |
| 2007/0198576 A1 | 8/2007 | Constantin |
| 2007/0219858 A1 | 9/2007 | Seymour |
| 2007/0245001 A1 | 10/2007 | Bjork |
| 2008/0021898 A1 | 1/2008 | Hoglund |
| 2008/0040396 A1 | 2/2008 | Wallis |
| 2008/0120290 A1 | 5/2008 | Delgo |
| 2008/0249994 A1 | 10/2008 | Passmore |
| 2008/0294729 A1 | 11/2008 | Ionescu |
| 2009/0006181 A1 | 1/2009 | Ghosh |
| 2009/0037262 A1 | 2/2009 | Patil |
| 2009/0182755 A1 | 7/2009 | Adair |
| 2009/0327342 A1 | 12/2009 | Xiao |
| 2010/0049535 A1 | 2/2010 | Chari |
| 2010/0145718 A1 | 6/2010 | Elmore |
| 2010/0306194 A1 | 12/2010 | Evans |
| 2011/0055040 A1 | 3/2011 | Foster |
| 2012/0089606 A1 | 4/2012 | Eshwar |
| 2012/0101890 A1* | 4/2012 | Matsushita ........ G06Q 30/0224 705/14.25 |
| 2012/0246073 A1 | 9/2012 | Gore |
| 2012/0246302 A1 | 9/2012 | Lafleur |
| 2012/0290938 A1 | 11/2012 | Subbarao |
| 2012/0311036 A1 | 12/2012 | Huhn |
| 2012/0330717 A1 | 12/2012 | Subramanian |
| 2013/0018713 A1 | 1/2013 | Kumar |
| 2013/0138507 A1 | 5/2013 | Kumar |
| 2013/0326058 A1 | 12/2013 | Brady |
| 2014/0058821 A1 | 2/2014 | Subbarao |
| 2014/0058874 A1 | 2/2014 | Tung |
| 2014/0074649 A1 | 3/2014 | Patel |
| 2014/0114753 A1 | 4/2014 | Xiao |
| 2014/0136528 A1 | 5/2014 | Anima |
| 2014/0180793 A1* | 6/2014 | Boal ................... G06Q 30/0251 705/14.43 |
| 2014/0214594 A1 | 7/2014 | Singh |
| 2014/0236879 A1 | 8/2014 | Bolivar |
| 2014/0279274 A1 | 9/2014 | Subbarao |
| 2014/0297456 A1 | 10/2014 | Sapugay |
| 2014/0297457 A1 | 10/2014 | Sapugay |
| 2014/0297458 A1 | 10/2014 | Sapugay et al. |
| 2015/0039671 A1 | 2/2015 | Jalan |
| 2015/0134734 A1 | 5/2015 | Bishop |
| 2015/0262249 A1* | 9/2015 | Wical ................. G06Q 30/0269 705/14.55 |
| 2016/0034530 A1* | 2/2016 | Nguyen ............. G06F 16/2471 707/719 |
| 2016/0210321 A1* | 7/2016 | Gong ..................... H04L 67/30 |
| 2017/0046727 A1* | 2/2017 | Chau ................. G06Q 30/0631 |

OTHER PUBLICATIONS

U.S. ISA, "International Search Report—Application No. PCT/US15/56235", dated Jan. 7, 2016, WIPO.

Benner, Robert, Harnessing Many-Core Processors for Scalable, Highly Efficient, and Adaptable Firewall Solutions, Jan. 1, 2013, 2013 International Conference on Computing, Networking and Communications, Communications and Information Security Symposium, pp. 637-641 (Year: 2013).

Extended European Search Report for Application No. 16194216.4, dated Jan. 24, 2017 (9 pages).

Fatala, A., et al., "AWS re:Invent, Using AWS to build a graph-based product recommendation system," 2013, Amazon Web Services retrieved online <www.slideshare.net/AmazonWebServices/using-aws-to-build-a-graphbased-woduct-recommendation-system-bdt303-aws-reinvent-2013>, retrieved on 1113/2017 (100 pages).

Musselman, A., "Building a Recommender with Apache Mahout on Amazon Elastic MapReduce (EMR)," 2014, 4ccenture, AWS Big Data Blog, <https://aws.amazon.com/blogs/big-data/building-a-recommender-with-apache-mahout-on-amazon-elastic-mapreduce-emr/>, retrieved Jan. 13, 2017.

Padnick, J., "A Comprehensive Guide to Building a Scalable Web App on Amazon Web Services—Part 1," Jan. 31, 2015, <https://www.airpaircom/aws/posts/building-a-scalable-web-app-on-amazon-web-services-pl>, retrieved on Jan. 12, 2017 (35 pages).

European Patent Office Decision to Refuse European Patent Application issued in Application No. EP16194216.4, dated Jan. 7, 2020, 39 pages.

\* cited by examiner

Fig. 1

Prior Art

SCALABLE SYSTEMS AND METHODS FOR GENERATING AND SERVING RECOMMENDATIONS

TECHNICAL FIELD

This application generally relates to computer systems and methods for generating and serving recommendations for content, products, and/or services that are related to a user's online and/or offline activity.

BACKGROUND

Commercial websites and applications often provide recommendations to their users. Such recommendations can include content related to the current webpage or application accessed by the user (e.g., a related news story), a product related to a product in a user's shopping cart (e.g., a recommendation for socks if the user is buying shoes), or a promotion/advertisement related to the current webpage accessed by the user and/or a product in a user's shopping cart. Product and offer recommendations can also be injected into email communications sent to users. Recommendations that are personalized, relevant, and appropriate can help increase user traffic, sales, and/or revenue and, therefore, they are important components of commercial websites and applications.

In order to generate a relevant recommendation, a recommendation engine takes into account one or more factors or data regarding the user and/or the content of the current webpage accessed by the user. Generally, the recommendation engine uses real-time information as well as historical information accumulated over large periods of time to generate the recommendation. Such a recommendation engine requires memory and processing power, which may vary depending on the volume of user traffic, the number of products or offers in the merchant's catalog, and the amount of historical data available. The recommendation engine also requires network bandwidth to serve the recommendation without an undesired latency delay.

Figure 1:
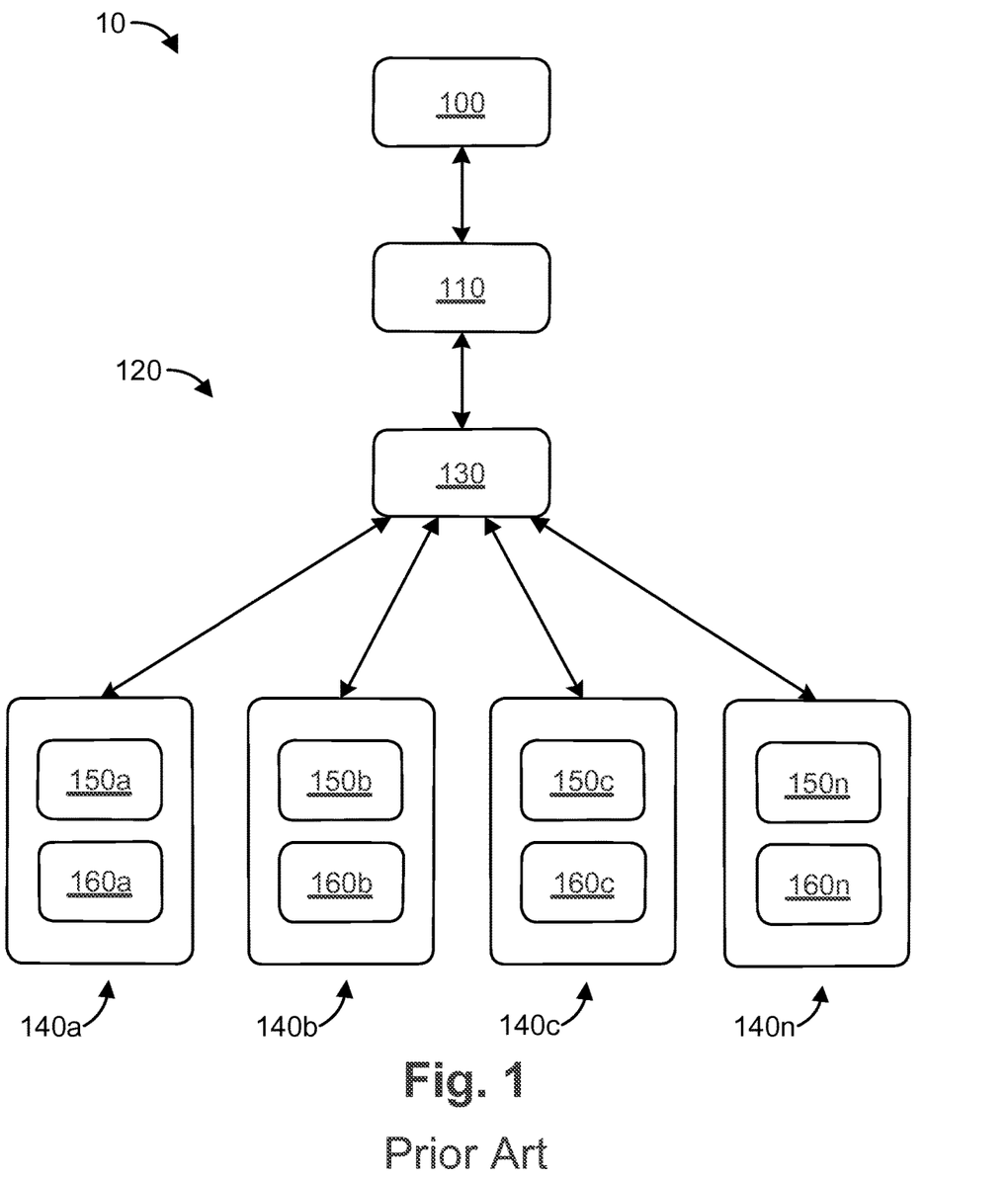
FIG. 1 is a block diagram of a system for providing recommendations to a client according to the prior art.

FIG. 1 is a block diagram of a system 10 for providing recommendations to a client 100 according to the prior art. As a user is viewing a webpage on the client 100 that is downloaded from a host 110, the host 110 transmits a request for a recommendation to a recommendation backend 120. The recommendation backend 120 includes a routing server 130 and a plurality of recommendation servers 140a, 140b, 140c, 140n. The recommendation servers 140a, 140b, 140c, 140n each include a logic processor 150a, 150b, 150c, 150n, and a memory 160a, 160b, 160c, 160n, respectively. Although the processors may vary between recommendation servers, each memory is a mirror image of the other memories. Each memory contains all the information that the respective server needs to respond to a recommendation request.

The routing server 130 receives the recommendation request and determines which recommendation server 140a, 140b, 140c, 140n to send the recommendation request to. The routing server 130 can take various factors into consideration to determine the appropriate recommendation server 140a, 140b, 140c, 140n to handle the recommendation request, such as the available capacity and the geographic location of each recommendation server. The routing server 130 then transmits the recommendation request to the appropriate recommendation server 140a to process the request. Upon receiving the recommendation request, the processor 150a queries the memory 160a for data relevant to the request. Such data can include personal information regarding the user, information regarding the webpage or website accessed by the user, and/or a list of products related to a product in the user's shopping cart. The processor 150a then applies logic (e.g., a recommendation algorithm) to the data and returns a recommendation to the routing server 130, which then transmits the recommendation to client 100 via the host 110.

In response to the volume of recommendation requests (e.g., due to increased or decreased website traffic), the routing server 130 can adjust the number of recommendation servers 140a, 140b, 140c, 140n upwards or downwards. If the routing server 130 needs to deploy a new recommendation server 140n in response to an increased volume of recommendation requests, the routing server 130 must first cause an existing recommendation server 140c to copy its memory 160c to the memory 160n of the new server 140n. Since the memory 160c is very large, it may take several hours or more to copy memory 160c to memory 160n. Thus, it may take several hours or more to deploy the new recommendation server 140n. Also, some of the bandwidth of server 140c is diverted to bring new server 140n online. Since the backend 120 is overcapacity (or near overcapacity) until new server 140n is brought online, the recommendation requests will take longer to process, which results in an undesired latency. For this reason, new recommendation servers are often deployed before their capacity is truly needed to allow for adequate time to copy the data to the new server. As a result, recommendation backends 120 generally operate at over capacity, which results in undesired costs and inefficiencies.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

Aspects of the invention are directed to the use of stateless servers or processors, which generally do not retain (store) information regarding the state of some or any transactions or conditions, e.g., session data from interactions with a client computer. A scalable recommendation engine includes stateless processors in communication with at least one memory server that stores contextual data. A router is configured to direct a recommendation request to a first stateless processor, which is configured to generate a recommendation using contextual data from the memory server. A controller monitors the available processing bandwidth of the stateless processors and deploys an additional stateless processor if the available processing bandwidth is less than a minimum available processing bandwidth threshold. The controller can remove from deployment a stateless processor if the available processing bandwidth is greater than a pre-set available processing bandwidth threshold, which can be referred to here as a maximum, pre-set maximum or pre-determined maximum bandwidth.

In an aspect, the invention induces a method of generating a recommendation for a user operating a client. The method comprises in a recommendation generation engine having an array of stateless processors in communication with a memory, receiving a recommendation request from a host.

The method also comprises in said recommendation generation engine, directing said recommendation request to a first stateless processor in said array of stateless processors. The method also comprises in said first stateless processor, receiving contextual data in response to a contextual data query to said memory, said contextual data including a webpage currently accessed by said client. The method also comprises in said first stateless processor, generating said recommendation using said contextual data, said recommendation for a related content of said webpage.

In another aspect, the invention includes a method of controlling a processing capacity of a recommendation engine comprising a plurality of stateless processors and a plurality of memory servers. The method comprises monitoring an available processing bandwidth of said recommendation engine. The method also comprises determining if the available processing bandwidth is less than a minimum available processing bandwidth threshold. The method also comprises activating an additional stateless processor if the available processing bandwidth is less than the minimum available processing bandwidth threshold.

In another aspect, the invention includes a scalable recommendation engine. The recommendation engine comprises a plurality of stateless processors; at least one memory server in communication with the plurality of stateless processors, the memory server storing contextual data; a router in communication with the plurality of stateless processors to direct a recommendation request to a first stateless processor, wherein the first stateless processor is configured to generate a recommendation using said contextual data; and a controller in communication with the plurality of processors, the controller configured to monitor an available processing bandwidth of said plurality of processors and to deploy an additional stateless processor if the available processing bandwidth is less than a minimum available processing bandwidth threshold.

IN THE DRAWINGS

For a fuller understanding of the nature and advantages of the present invention, reference is made to the following detailed description of preferred embodiments and in connection with the accompanying drawings, in which.

DETAILED DESCRIPTION

Figure 2:
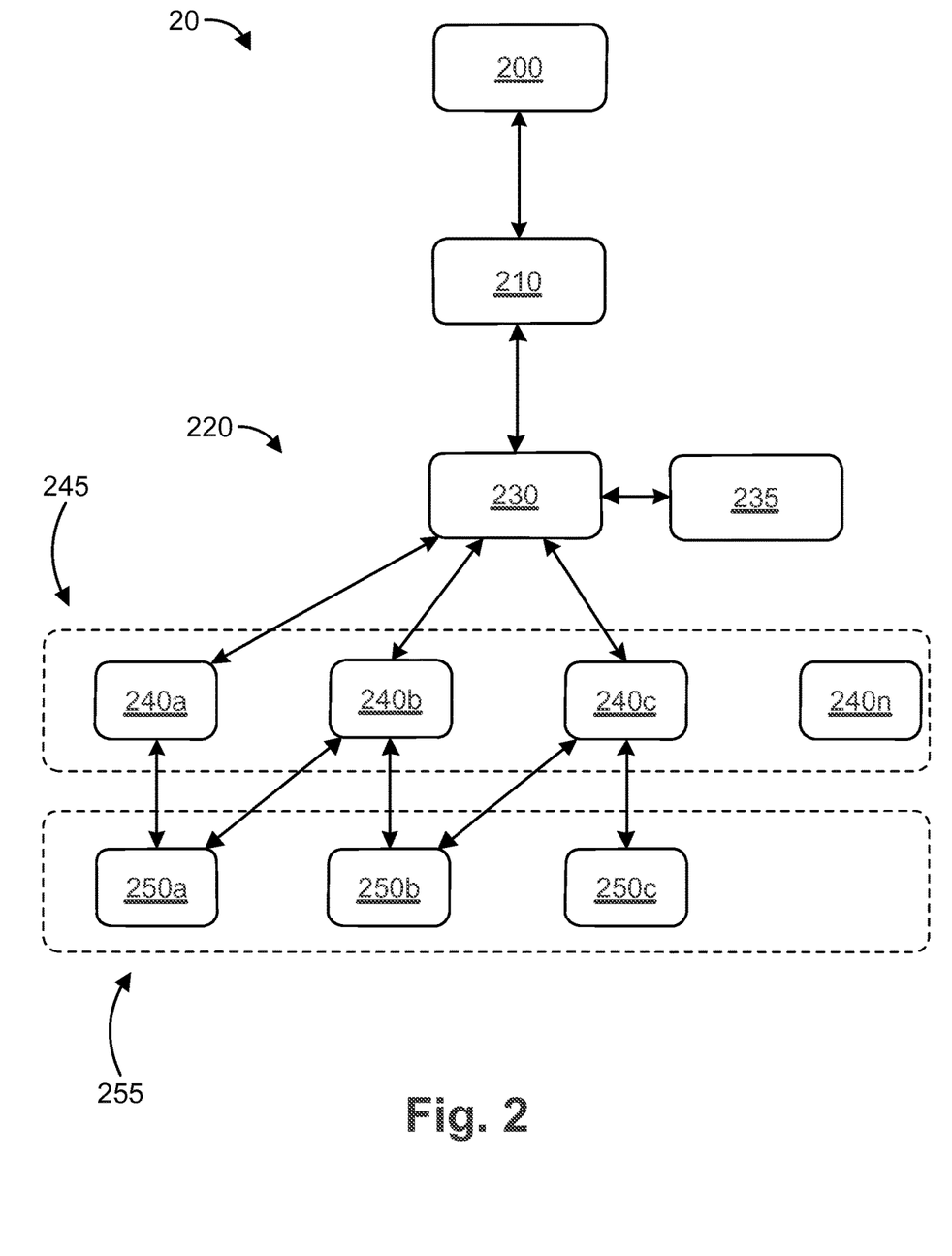
FIG. 2 is a block diagram of a system for providing recommendations to a client according to an embodiment.

FIG. 2 is a block diagram of a system 20 for providing recommendations to a client 200 according to an embodiment. The system 20 includes the client 200, a host 210, and a recommendation engine 220. The recommendation engine 220 includes a router server 230, a controller 235, stateless logic processors 240a, 240b, 240c, 240n (generally 240), and memory stores 250a, 250b, 250c (generally 250). The stateless logic processors 240 are servers or virtual servers that provide computing power for the recommendation engine 220. In some embodiments, each logic processor 240 is identical. The logic processors 240 are stateless in that they do not permanently store the data needed to generate a recommendation. Instead, the data is stored in memory stores 250, which can be accessed by the stateless processors 240 through a query.

Since the stateless logic processors 240 and memory stores 250 are decoupled, a new stateless logic processor 240n can be brought online quickly and independently because data does not need to be copied into a new memory store 250n associated with the new stateless logic processor 240n. Also, since the logic processors 240 can be identical or substantially identical to one another, there is little configuration or lead time needed to bring a new stateless logic processor 240 online. For example the new stateless logic processor 240 only needs to load the recommendation service loaded and to retrieve configuration parameters (e.g., logic or rules for recommendations) prior to going online. Thus, the recommendation engine 220 can activate and deactivate the stateless logic processors 240 in close to real time as the capacity needs of the recommendation engine 220 fluctuate, providing a highly scalable recommendation engine 220. For example, a new stateless logic processor 240n can be activated quickly if the recommendation engine 220 receives (or expects to receive) a surge in recommendation requests. Also, an existing stateless processor (e.g., 240c) can be deactivated if the volume of recommendation requests drops below a threshold value or the logic processors 240 are operating at greater than a pre-set maximum capacity (e.g., greater than 50% excess capacity). Since the logic processor (e.g., 240c) can be re-activated in short order, there is minimal risk in deactivating the logic processor.

The memory stores 250 can include one or more databases (or other methods of/structures for data storage) hosted in a cluster of on one or more servers and/or virtual servers. In some embodiments, the memory stores are Redis data servers or data server instances. In some embodiments, the memory stores 250 can communicate with one another. In addition, the servers and/or virtual servers in a given cluster can communicate with each other, for example to shard data across the cluster. A new memory store 250 can be brought online when extra storage capacity (e.g., for recommendation data) is needed and/or for geographic distribution of the memory store 250 (e.g., adding a memory store 250 in Europe to service the European market). For example, additional recommendation data can be driven by new customers, new products, or the like. Such a new memory store 250 can be brought online without having to bring a new stateless processor 240 online.

In operation, a user accesses the client 200 to view a webpage or an email promotional advertisement. The contents of the webpage are transmitted to the client 200 from the host 210 over a first network (e.g., a first wide area network). In parallel (or at any time), the host 210 and/or client 200 can send a request for a recommendation to the recommendation engine 220. The recommendation request can include information relating to the user's browsing activity, the user's account information, the products in the user's shopping cart, the type of device operated by the user, and/or the time and/or date that the recommendation request was generated. The user's browsing activity can induce the advertisement, promotional email, or URL link (e.g., a link for an advertisement, a link for a product or service, etc.) that the user accessed to generate the recommendation request. The request can be sent over an API.

The recommendation request is sent over a second network (e.g., a second wide area network), which can be the same or different than the first network. The router server 230 receives the recommendation request and selects a stateless logic processor 240 (e.g., stateless logic processor 240a) to process the recommendation request. The router server 230 can select the stateless logic processor 240 based on the percentage of a pre-set maximum capacity at which the stateless logic processor 240 is operating, the geographic location of the stateless logic processor 240, and/or the network bandwidth for the stateless logic processor 240. The router server 230 then forwards the recommendation request to the appropriate stateless logic processor 240 (e.g., stateless processor 240a). In some embodiments, the router server 230 is in communication with a load balancer to balance the processing workload across the available stateless processor 240.

The controller 235 is in communication with the router server 230 over a network (e.g., a local area network or a wide area network). In some embodiments, the controller 235 and router server 230 are on the same server or virtual server. The controller 235 is configured to determine the available bandwidth of the stateless processors 240, for example by sending queries to each logic processor 240 via the router server 230. Alternatively, the available bandwidth of the stateless processors 240 is measured directly and/or pushed to the controller 235. If the available processing bandwidth is less than a minimum pre-determined threshold value (e.g., 5%, 10%, or 20%), the controller 235 can deploy additional stateless processors 240 to increase the available processing bandwidth. In addition or in the alternative, the controller 235 can deploy additional stateless logic processors 240 in advance of an anticipated increase in recommendation requests even though the available processing bandwidth is greater than the minimum threshold value described above. For example, the controller 235 can deploy additional stateless logic processors 240 in advance of an email promotional campaign or due to other expected increases in recommendation request traffic (e.g., on Black Friday). Likewise, the controller 235 can decrease the number of stateless processors 240 if the available processing bandwidth is greater than a maximum pre-determined threshold value (e.g., 25%, 30%, or 35%). For example, the controller 235 can first increase the number of stateless logic processors 240 in advance of an email campaign and then decrease the number of stateless logic processors 240 after the associated surge in recommendation requests has ended. In another example, the controller 235 increases the number of processors 240 during the day and decreases the number of processors 240 during the night. Deployment of additional processors 240 can include allocating additional processors 240 (e.g., from a service provider such as Amazon Web Services) and configuring the processors 240 with the recommendation service including algorithms (as described herein) for providing recommendations and related business logic. In some embodiments, the processors 240 periodically fetch the algorithms and business logic from the advertiser/retailer/service provider to make sure they are up to date.

The stateless logic processor 240 evaluates the information (if any) associated with the recommendation request and determines what contextual data to request from the memory store 250. The processor 240 then sends a query to an available memory store 250 (e.g., memory store 250b) for the appropriate contextual data. In some embodiments, the stateless logic processor 240 sends the query to multiple memory stores 250. The logic processor 240 can use the data from the first memory store 250 to respond to the query, or the logic processor 240 can use all responses. The contextual data can include the user's account number, the user's geographic location, the user's gender, the user's age, the user's website access history, the user's order history, the user's social media posts (or other social media interaction data), the contents of the webpage being accessed by the user, product reviews, product inventory, product pricing and sales, the product catalog, the popularity of each product, product ordering trends, the weather forecast, and similar information.

After the logic processor 240 receives the contextual data from the memory store 250 and stores the contextual data in a local memory or cache, the logic processor 240 applies an algorithm or other logic using at least some of the contextual data and the information received with the recommendation request to generate a relevant recommendation. At this stage, the logic processor 240 can apply any merchant-defined business rules to filter/influence the recommendations shown to the user. For example, the merchant might decide not to show any products on clearance to the user. Another example might be that the merchant might decide which brands are eligible to be shown to a user depending on the brand of the current product the user is browsing. Another example might be that the merchant prefers products with certain attributes (e.g., color, fit, style, etc.) over others to be shown as recommendations. The algorithms and business rules are processed and applied by logic processor 240 to generate a recommendation. The processor 240 then transmits the recommendation to the router server 230, which forwards the recommendation to the host 210 to provide to the client 200. In some embodiments, different algorithms can be applied to similar users, for example, to test the relative performance of the algorithms.

The recommendation can be for related content (e.g., a related news story) selected just for that particular user, a related product or service (e.g., tennis balls if the user is buying a tennis racket) selected just for that particular user, a promotion (e.g., a sale for men's clothing if the user is a male) selected just for that particular user, or a similar recommendation as understood by those skilled in the art.

In some embodiments, the router server 230 can send the recommendation request to multiple stateless processors 240 in order to obtain multiple recommendations based on different algorithms, and the results of the recommendations requests can be combined or merged together. For example, logic processor 240a may apply an algorithm cased on the user's gender and logic processor 240b may apply an algorithm based on the products in the user's shopping cart. The router server 230 or a third logic processor 240c can merge the two recommendations into a single recommendation for the user. Alternatively, the router server 230 or third logic processor 240c can provide both recommendations to the user. In some embodiments, the configuration parameters retrieved from the merchant can determine whether a recommendation request is sent to multiple processors 250.

While operation of the recommendation engine 220 has been described with respect to a webpage or email, the recommendation engine 220 is not limited to these technologies. The recommendation engine 220 can be applied to any technology in which a recommendation is desired. For example, the recommendation engine 220 can be applied to applications, video games, online dating, smart phones, in-store advertisements, coupons (online or in-store printed at checkout), vending machines, e-book readers, or restaurants (e.g., menu recommendations).

In some embodiments, the recommendation engine 220 can be described as having an outer layer 245 of stateless logic processors 240 and an inner layer 255 of memory stores 250. The number of stateless logic processors 240 in the outer layer 245 can be adjusted upwards or downwards based on the capacity needs of the recommendation engine 220, the volume of recommendation requests received by the recommendation engine 220, and/or the network traffic. The stateless logic processors 240 in the outer layer 245 communicate with the memory stores 250 in the inner layer 255 to access contextual data for generating the recommendations.

Figure 3:
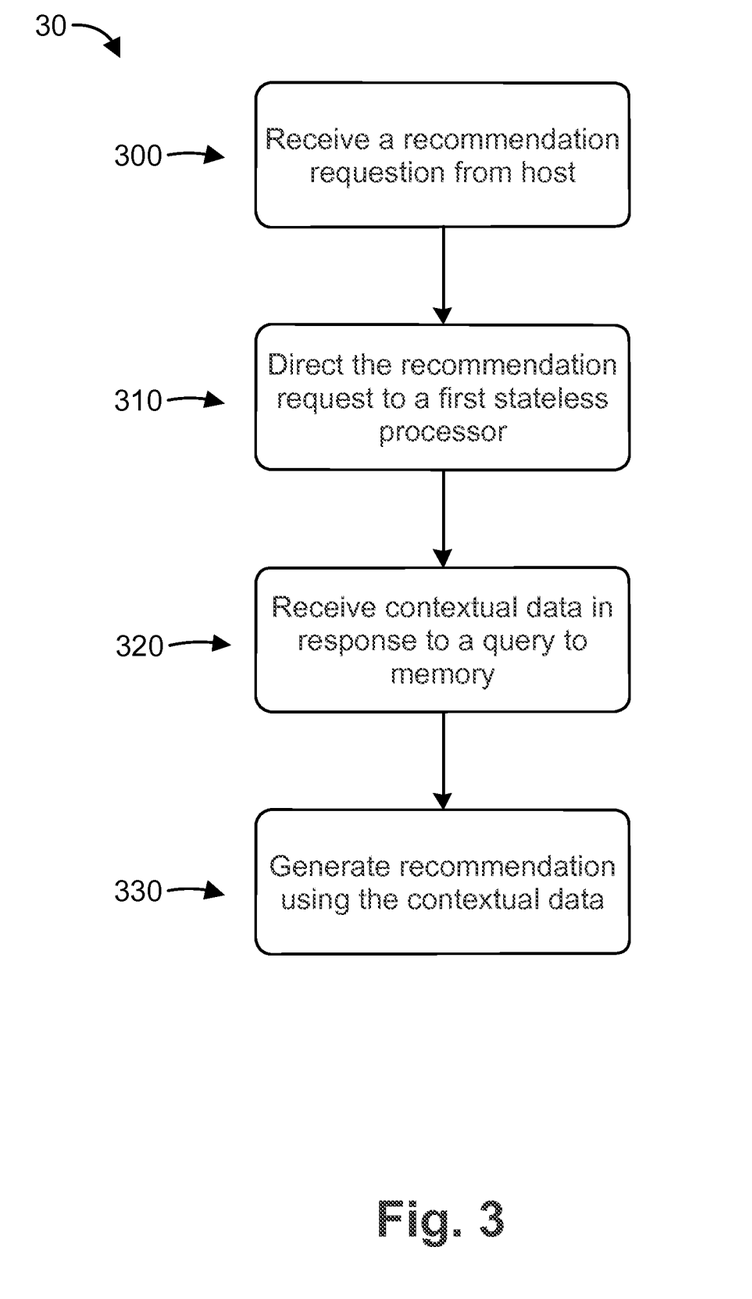
FIG. 3 is a flow chart of a method for generating a recommendation request according to an embodiment.

FIG. 3 is a flow chart of a method 30 for generating a recommendation request according to an embodiment. The method 30 includes 300 receiving a recommendation request from a host. As discussed above, the recommendation request can include information relating to the user's browsing activity, the user's account information, the products in the user's shopping cart, the type of device operated by the user, and/or the time and/or date that the recommendation request was generated. The method also includes 310 directing the recommendation request to a first stateless logic processor. The recommendation request can be directed to the first stateless logic processor by a router or a router server as discussed above. The method also includes 320 receiving (e.g., at a stateless logic processor) contextual data in response to a query to a memory store. The method also includes 330 generating (e.g., at a stateless logic processor) a recommendation request using at least some of the contextual data.

Figure 4:
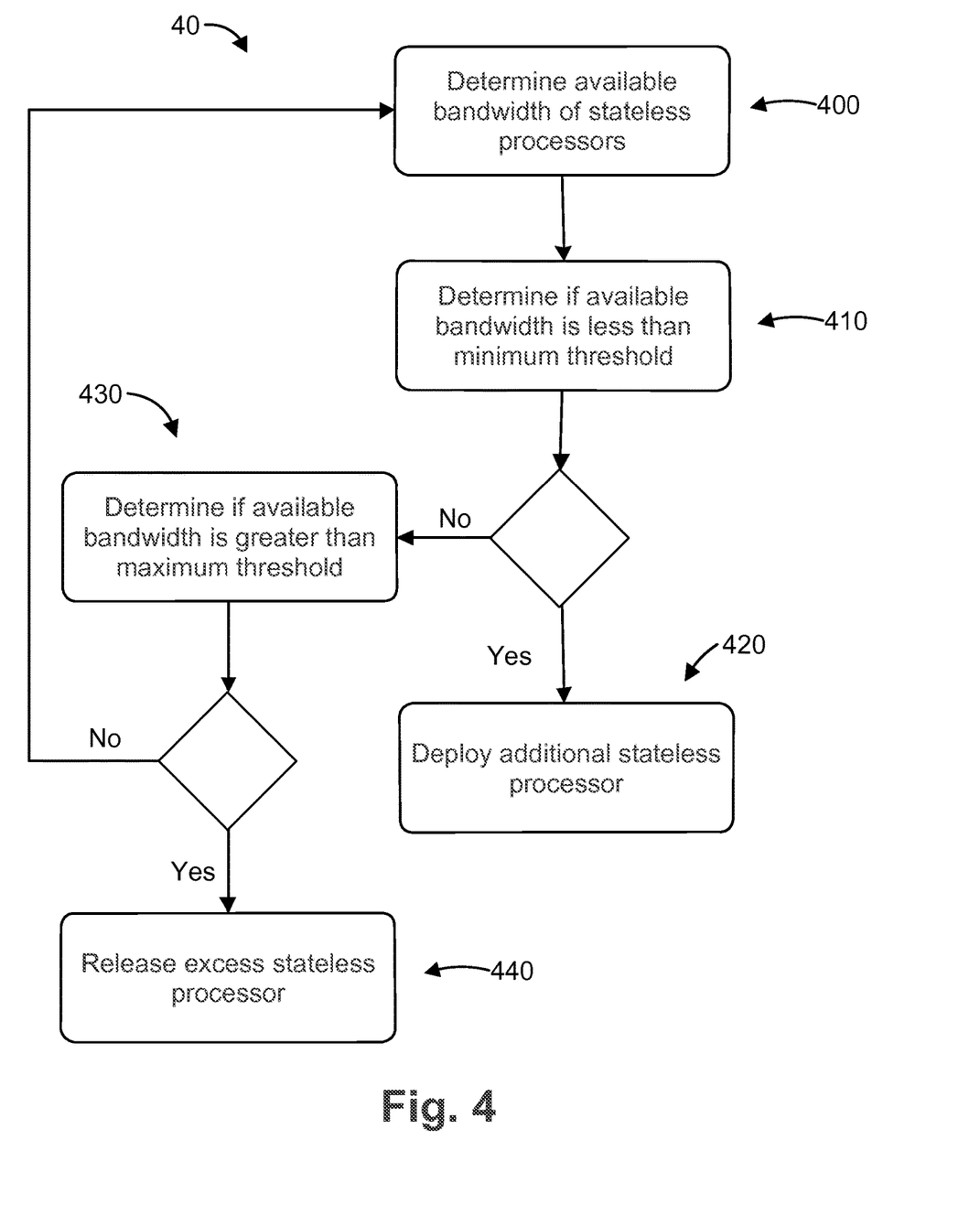
FIG. 4 is a flow chart of a method for controlling the capacity of a recommendation engine according to an embodiment.

FIG. 4 is a flow chart of a method 40 for dynamically controlling the capacity of a recommendation engine. The method 40 includes 400 determining the available processing bandwidth of the stateless logic processors (e.g., stateless logic processors 240). At 410, the available processing bandwidth is compared to a minimum available processing bandwidth threshold. The minimum available processing bandwidth threshold can be set manually by an operator (e.g., through an administrator user interface) or it can be set automatically based on historical data or best practices. The minimum available processing bandwidth threshold can be 5%, 10%, 15%, 20%, or any value therebetween. If the available processing bandwidth is less than the minimum available processing bandwidth threshold, at 420 one or more additional stateless logic processors are deployed to increase the available processing bandwidth of the recommendation engine. In some embodiments, additional stateless logic processors are deployed iteratively. For example, a first additional stateless processors can be deployed and then the available processing bandwidth can be determined. If the available processing bandwidth is still less than the minimum processing bandwidth threshold, a second additional logic stateless processor can be deployed and then the available processing bandwidth can be determined again. This iterative process can continue until the available processing bandwidth is greater than the minimum available processing bandwidth threshold.

If the available processing bandwidth is not less than the minimum available processing bandwidth threshold, the method proceeds to 430. At 430, the available processing bandwidth is compared to the pre-set maximum available processing bandwidth threshold. The pre-set maximum available processing bandwidth threshold can be set manually by an operator (e.g., through an administrator user interface) or it can be set automatically based on historical data or best practices. The pre-set maximum available processing bandwidth threshold can be 40%, 45%, 50%, or any value therebetween. If the available processing bandwidth is greater than the pre-set maximum available processing bandwidth threshold, one or more excess stateless processors are released from deployment to reduce the excess processing bandwidth of the recommendation engine. In some embodiments, excess stateless logic processors can be released from deployment iteratively. For example, a first excess stateless logic processor can be released from deployment and then the available processing bandwidth can be determined. If the available processing bandwidth is still greater than the pre-set maximum available processing bandwidth threshold, a second excess stateless logic processor can be released from deployment and then the available processing bandwidth can be determined again. This iterative process can continue until the available processing bandwidth is less than the pre-set maximum available processing bandwidth threshold. In these sections, processing bandwidth may refer to CPU usage, memory usage, network usage, or a combination of these factors.

Figure 5:
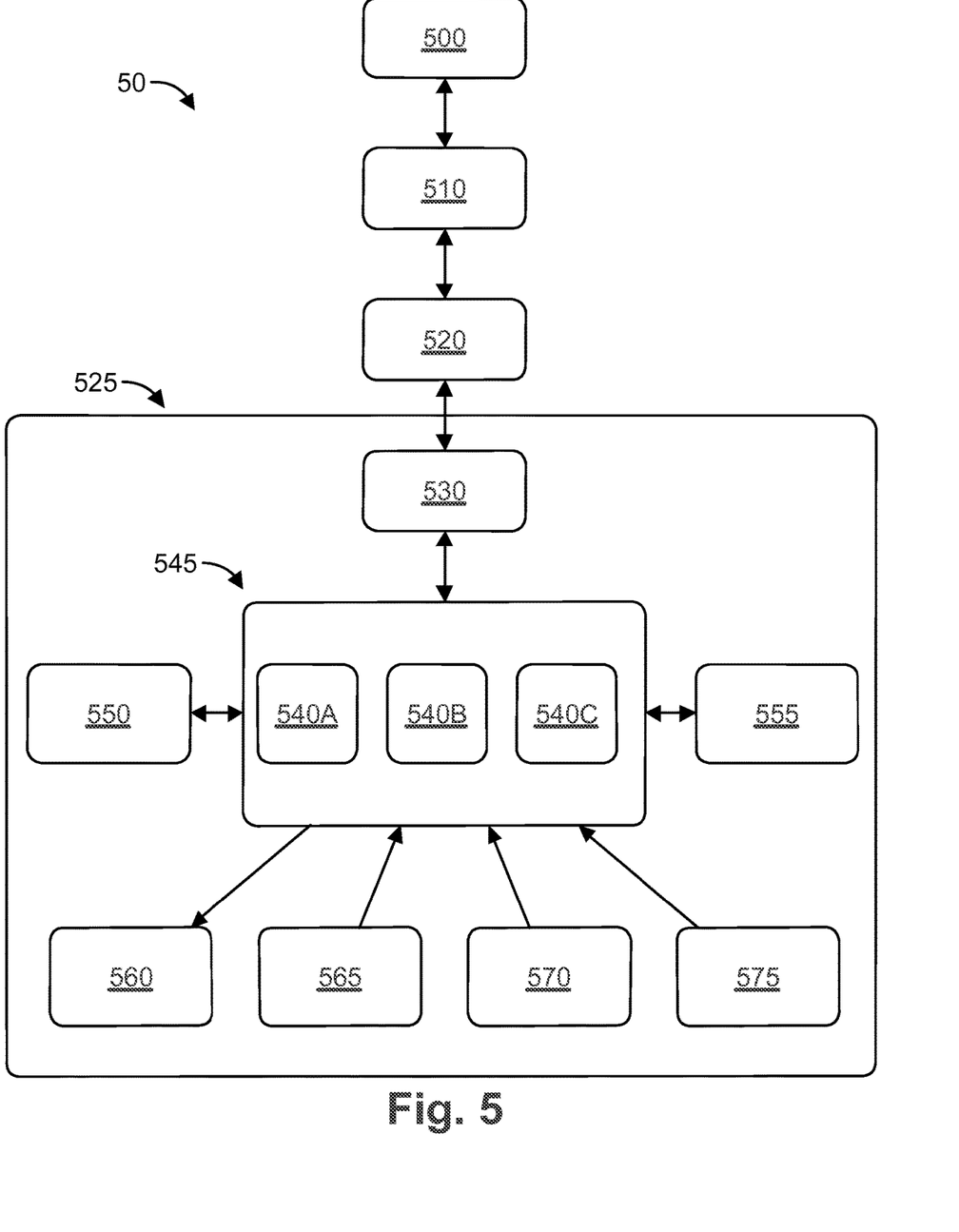
FIG. 5 is a block diagram of a system for providing recommendations to a client according to an embodiment.

FIG. 5 is a block diagram of a system 50 for providing recommendations to a client 500 according to another embodiment. The system 50 includes a host 510, a router 520, and a regional recommendation engine 525. The regional recommendation engine 525 includes a load balancer 530, stateless logic processors 540A, 540B, 540C (generally 540), a product server 550, a cache server 555, logging servers 560, precomputed recommendation servers 565, real-time model scoring servers 570, and analytics servers 575. The regional recommendation engine 525 represents one of a plurality of recommendation engines that can be geographically distributed to provide fast response times.

Similar to the embodiments discussed above, the client 500 is in communication with the host 510, for example by accessing a website or email server hosted by the host 510. The client 500 or host 510 sends a request for a recommendation, which is transmitted to the router 520. The router 520 directs the recommendation request to regional recommendation engine 525. The regional recommendation engine 525 can be selected based on the relative locations of the client 500 and the recommendation engine 525 and/or the available processing bandwidth of the recommendation engine 525. The router 520 can be a DNS latency router.

The recommendation request is sent to a load balancer 530, which directs the request to a stateless logic processor cluster or layer 545. The load balancer 530 determines the available processing bandwidth of each stateless logic processor 540 in the stateless logic processor cluster/layer 545 and directs the recommendation request to the stateless logic processor 540 with the most available processing bandwidth to distribute the processing load across the stateless processors 540.

The stateless processors 540 are in communication with product server 550, cache server 555, logging servers 560, pre-computed recommendation servers 565, real-time model scoring servers 570, and analytics servers 575. The stateless processor 540 can query or call the pre-computed recommendation servers 565 for one or more pre-calculated recommendations. The pre-calculated recommendations can include the most popular products overall, the most popular products for customers from the same city or region, products that are commonly purchased together (e.g., shirts and ties), popular products for the current season, products on sale, etc. Pre-calculated recommendations can also include recommendations based on historical online activity and/or purchases by the customer. In addition, the stateless processor 540 can query or call the real-time model scoring servers 570 for one or more real-time recommendations based on the user's online activity. Examples of real-time recommendations include recommendations based on items in the user's shopping cart, recommendations based on the user's browsing history within the retailer's website, and recommendations based on the user's online activity generally (e.g., social media posts, web searches, etc.).

After the stateless processor 540 receives the recommendations from the pre-computed recommendation servers 565 and/or the real-time model scoring servers 570, the stateless processor 540 can communicate with the product server 550. For example, the product server 550 has a database of the product catalog offered by the retailer. Thus, the stateless processor 540 can query the product server 550 for the current product offerings that match the recommended products, such as the actual ties currently available in response to a recommendation for ties. The product server 550 also includes various metadata about each product, such as its price, whether it's on sale, whether it's a new product or a product near the end of its lifecycle, the inventory of the product, the season for which the product is intended (e.g., heavy coats for winter), etc. The stateless processor 540 can use the product metadata to select additional recommended products based on recommendations from pre-computed recommendation servers 565 and/or from real-time model scoring servers 570. The stateless processor 540 can temporarily store data in cache server 555 while processing the recommendation request. For example, the cache server 555 can store intermediate and/or final calculations from stateless processor 540 to speed up subsequent responses.

The logging servers 560 can log the recommendation requests and the recommendations processed by the stateless processor 540 for later analysis. The analytics servers 575 can track user activity on retailer websites and compute certain metrics for later use. For example, the analytics servers 575 can be used to track the conversion rate (sales) of the recommended products and the methodology used to generate the recommendations.

Figure 6:
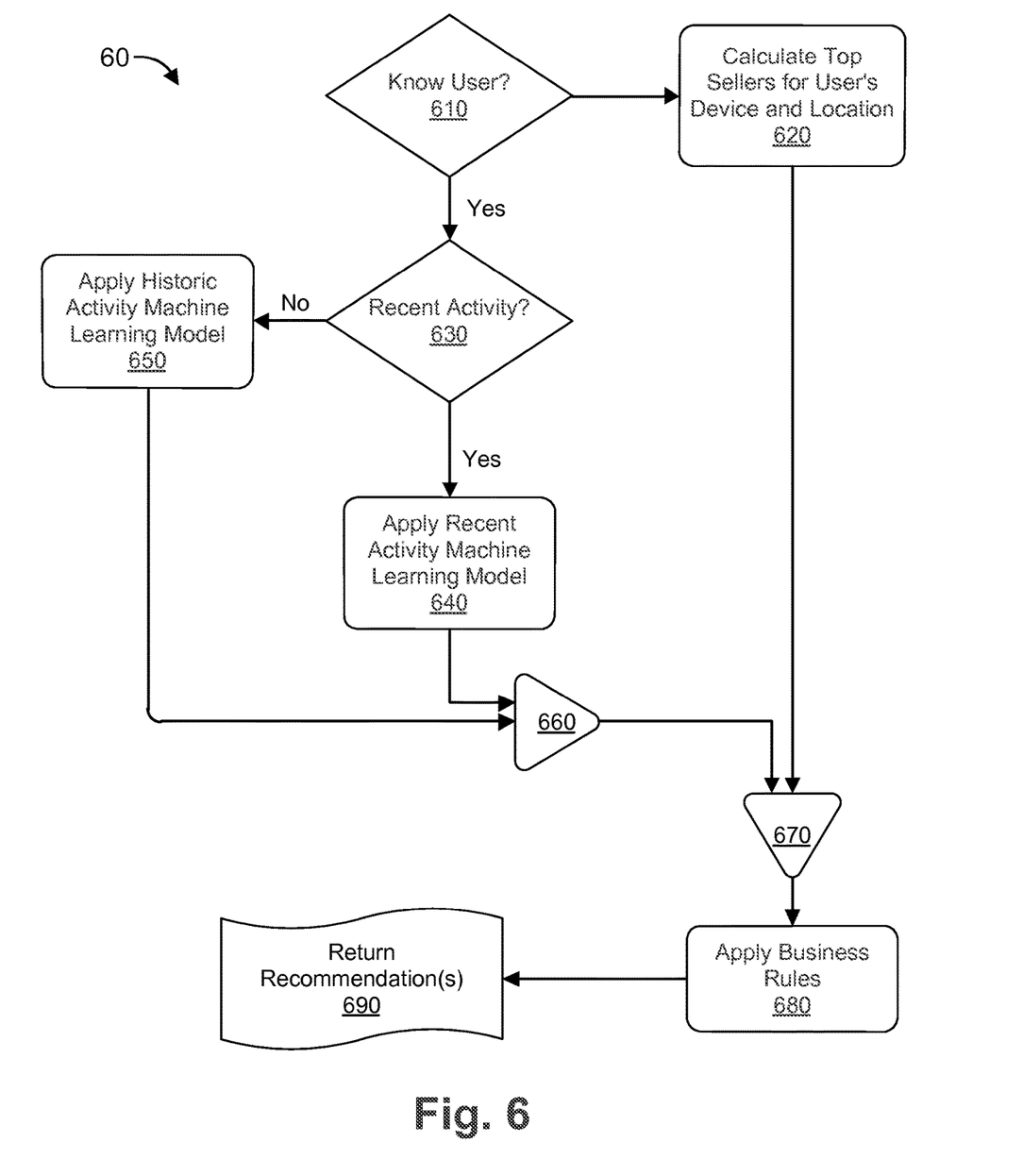
FIG. 6 is a flow chart 60 for recommending a product to a user.

FIG. 6 is a flow chart 60 for recommending a product to a user. In step 610, the stateless processor determines whether the user is known to the merchant. For example, the stateless processor can query a user database based on the user's email address, the user's IP address, data in a cookie on the user's device, etc. If the user is not known to the merchant, in step 620 the recommendation engine generates a preliminary recommendation based on aggregate sales data. For example, the recommendation engine can generate a preliminary recommendation based on the top products sold to users that have the same device or that live in the same location as the user for which the recommendation is intended. If the user is known to the merchant, in step 630 the recommendation engine determines whether it has any data on recent activity (e.g., browsing activity, products in shopping cart, etc.) for the user. If there is data for recent activity, the recommendation engine applies a recent activity machine learning model 640 to generate a preliminary recommendation. The recent machine learning model 640 uses only very recent activity to generate the preliminary recommendations. If there is no data for recent activity, the recommendation engine applies a historic activity machine learning model 650 to generate a preliminary recommendation. The historic activity machine learning mode 650 uses all available historical data for the user to generate the preliminary recommendations. In some embodiments, both the recommendation engine applies both the recent activity machine learning model 640 and the historic activity machine learning model 650.

The output of the recent activity machine learning model 640 and/or the historic activity machine learning model 650 is merged at step 660 (though no merger is necessary if only one of models 640 and 650 is applied). The output of step 660 is combined with the output of step 620 at step 670 to provide a combined preliminary recommendation output. In other words, the preliminary recommendations generated at step 620 (unknown user model) are merged with the preliminary recommendations from steps 640 and/or 650 (known user models) to provide a superset of preliminary recommendations. At step 680, business rules are applied to the combined preliminary recommendation output to generate a final recommendation, which is returned to the host/user at step 690. The business rules applied in step 680 can include which products are on sale, which products the merchant wants to promote, which products are in season, etc., as discussed above.

As would now be appreciated, the above systems and methods allow for the dynamic increase or decrease in processing bandwidth of a recommendation engine. Such systems and methods can reduce the undesired processing latency in recommendation engines that operate at overcapacity while additional processing power is brought online. The systems and methods can also provide cost savings because the recommendation engine does not need to operate at overcapacity since additional processing power can be deployed dynamically. As such, the excess processing power can be released for more productive use within an enterprise or released back to the cloud provider (e.g., Amazon).

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A computer-implemented method of generating a recommendation for a user, the method comprising:
   receiving, by a router, a recommendation request;
   determining, by a controller, a total available processing bandwidth for processing recommendation requests for a first quantity of a plurality of stateless recommendation processors;
   adjusting, by the router, the first quantity to a second quantity of the plurality of stateless recommendation processors based on at least one of a volume of recommendation requests and network traffic, wherein the second quantity is not equal to the first quantity;
   routing, by the router, the recommendation request to a plurality of stateless recommendation processors of the second quantity of the plurality of stateless recommendation processors;
   determining, by each of the plurality of stateless recommendation processors, contextual data needed to generate a stateless recommendation processor specific recommendation based on the recommendation request;
   querying, by each of the plurality of stateless recommendation processors, at least one common memory server for the contextual data based on the recommendation request, wherein the at least one common memory server
  is decoupled from each of the plurality of stateless recommendation processors,
  is in communication with each of the plurality of stateless recommendation processors, and
  stores the contextual data;
receiving, by each of the plurality of stateless recommendation processors, the contextual data in response to the querying from the at least one common memory server;
generating, by each of the plurality of stateless recommendation processors, a list of one or more recommended products based on an algorithm using the received contextual data and a configuration parameter received with the recommendation request, wherein the algorithm for each of the plurality of stateless recommendation processors is different from one another;
providing, by each of the plurality of stateless recommendation processors, the stateless recommendation processor specific recommendations including the list of one or more recommended products to the user in response to the recommendation request.

2. The method of claim 1, wherein the configuration parameter is a configuration parameter from a merchant.

3. The method of claim 1, wherein the algorithm utilizes only a portion of the contextual data to generate the stateless recommendation processor specific recommendation in response to determining that the portion of contextual data is available.

4. The method of claim 1, wherein the algorithm utilizes all contextual data in response to determining, at a first time, that no portion of the contextual data is available at the time before the first time.

5. The method of claim 1, further comprising:
querying, by a first stateless recommendation processor of the plurality of stateless recommendation processors, a first data storage device of the at least one common memory server based on the recommendation request;
receiving, by the first stateless recommendation processor, contextual data from the first data storage device in response to the querying of the first data storage device;
determining, by the first stateless recommendation processor, whether to utilize contextual data from the first data storage device in generating the stateless recommendation processor specific recommendation; and
determining, by the first stateless recommendation processor, whether to utilize contextual data from the first storage device in generating the stateless recommendation processor specific recommendation.

6. The method of claim 1, wherein the contextual data comprises at least one data type selected from the group consisting of:
an account number of the user;
a geographic location of the user;
a gender of the user;
an age of the user;
a website access history of the user;
an order history of the user;
a social media interaction of the user;
a website currently being accessed by the user;
a product review;
product inventory;
product pricing;
product sales data;
a product catalog;
a product popularity;
a product ordering trend; and
a weather forecast.

7. The method of claim 1, further comprising:
activating, by the router, one or more stateless recommendation processors based on determining that the total processing bandwidth is less than a threshold value.

8. The method of claim 1, further comprising:
deactivating, by the router, one or more stateless recommendation processors based on determining that the total processing bandwidth is greater than a threshold value.

9. The method of claim 1, further comprising:
combining, using one of the router or any stateless recommendation processor of the plurality of stateless recommendation processors, at least two of the stateless recommendation processor specific recommendations.

10. The method of claim 1, further comprising:
querying, by a first stateless recommendation processor, a product server;
receiving, by the first stateless recommendation processor from the product server in response to the querying, product metadata corresponding to at least one product of the list of one or more recommended products that indicates at least one of an inventory, a pricing, promotions, a lifecycle, and a season; and
modifying the list of one or more recommended products based on the product metadata.

11. A scalable recommendation engine comprising:
a plurality of stateless recommendation processors deployed without data needed to generate a recommendation;
at least one common memory server that is common to the plurality of stateless recommendation processors, the at least one common memory server being in communication with the plurality of stateless recommendation processors and storing contextual data;
a router in communication with the plurality of stateless recommendation processors configured to direct a recommendation request to each of the plurality of stateless recommendation processors, each of the plurality of stateless recommendation processors being configured
  to receive the recommendation request from the router,
  to send a query for contextual data to the at least one common memory server,
  to receive that contextual data from the at least one common memory server,
  to apply an algorithm using the received contextual data and user information received with the recommendation request to generate a stateless recommendation processor specific recommendation, wherein the algorithm for each of the plurality of stateless recommendation processors is different from one another, and
the router being configured to one of
  merge the plurality of stateless recommendation processor specific recommendations into a single recommendation to the user or
  provide the plurality of stateless recommendation processor specific recommendations to the user; and
a controller in communication with the plurality of stateless recommendation processors, the controller configured
  to monitor an available processing bandwidth of said plurality of stateless recommendation processors, and to deploy an additional stateless recommendation processor without data needed to generate a recommendation, if the available processing bandwidth is less than a minimum available processing bandwidth threshold.

12. The scalable recommendation engine of claim 11, wherein the controller is further configured to activate, by the router, one or more stateless recommendation processors based on determining that the total processing bandwidth is less than the threshold value.

13. The scalable recommendation engine of claim 11, wherein the controller is further configured to deactivate, by the router, one or more stateless recommendation processors based on determining that the total processing bandwidth is greater than the threshold value.

14. A scalable recommendation engine comprising:
a plurality of stateless recommendation processors deployed without data needed to generate a recommendation;
at least one common memory server that is common to the plurality of stateless recommendation processors, the at least one common memory server being in communication with the plurality of stateless recommendation processors and storing contextual data;
a router in communication with the plurality of stateless recommendation processors configured to direct a recommendation request to each of the plurality of stateless recommendation processors, each of the plurality of stateless recommendation processors being configured
to receive the recommendation request from the router,
to send a query for contextual data to the at least one common memory server,
to receive that contextual data from the at least one common memory server,
to apply an algorithm using the received contextual data and a configuration parameter received with the recommendation request to generate a stateless recommendation processor specific recommendation, wherein the algorithm for each of the plurality of stateless recommendation processors is different from one another, and
the router being configured to one of
merge the plurality of stateless recommendation processor specific recommendations into a single recommendation to the user or
provide the plurality of stateless recommendation processor specific recommendations to the user; and
a controller in communication with the plurality of stateless recommendation processors, the controller configured
to monitor an available processing bandwidth of said plurality of stateless recommendation processors,
to deploy an additional stateless recommendation processor without data needed to generate a recommendation, if the available processing bandwidth is less than a minimum available processing bandwidth threshold, and
to deactivate at least one activated stateless recommendation processor of the plurality of stateless recommendation processors based on determining that the total processing bandwidth is greater than the threshold value.

15. The scalable recommendation engine of claim 14, wherein the configuration parameter is a configuration parameter from a merchant.

16. The scalable recommendation engine of claim 14, wherein the algorithm utilizes only a portion of the contextual data to generate the stateless recommendation processor specific recommendation in response to determining that the portion of contextual data is available.

17. The scalable recommendation engine of claim 14, wherein the algorithm utilizes all contextual data in response to determining, at a first time, that no portion of the contextual data is available at the time before the first time.

* * * * *